US010650426B2

(12) United States Patent
Kaptsan et al.

(10) Patent No.: US 10,650,426 B2
(45) Date of Patent: May 12, 2020

(54) PERSONALIZING PRODUCTS WITH SOCIAL COLLABORATION

(71) Applicant: Dassault Systemes, Velizy Villacoublay (FR)

(72) Inventors: Igor Kaptsan, Waltham, MA (US); Francis L. Schurgot, III, Waltham, MA (US)

(73) Assignee: Dassault Systemes, Velizy Villacoublay (FR)

( * ) Notice: Subject to any disclaimer, the term of this patent is extended or adjusted under 35 U.S.C. 154(b) by 887 days.

(21) Appl. No.: 14/982,606

(22) Filed: Dec. 29, 2015

(65) Prior Publication Data

US 2017/0186064 A1    Jun. 29, 2017

(51) Int. Cl.
| | | |
|---|---|---|
| *G06Q 30/00* | (2012.01) | |
| *G06Q 30/06* | (2012.01) | |
| *G06Q 50/00* | (2012.01) | |
| *B33Y 50/02* | (2015.01) | |
| *B29C 64/386* | (2017.01) | |
| *G06F 30/00* | (2020.01) | |

(Continued)

(52) U.S. Cl.
CPC ....... *G06Q 30/0621* (2013.01); *B29C 64/386* (2017.08); *B33Y 50/02* (2014.12); *G06F 30/00* (2020.01); *G06Q 50/01* (2013.01); *B29L 2031/7432* (2013.01); *G06F 2111/02* (2020.01)

(58) Field of Classification Search
None
See application file for complete search history.

(56) References Cited

U.S. PATENT DOCUMENTS

2008/0189609 A1* 8/2008 Larson ................ G06F 17/211
                                                           715/273
2008/0276184 A1* 11/2008 Buffet ................. G06Q 10/10
                                                           715/752

(Continued)

FOREIGN PATENT DOCUMENTS

EP       1 672 533      6/2006
WO    WO 2011/055144    5/2011

OTHER PUBLICATIONS

Rayna, T., et al. "Co-Creation and User Innovation: The Role of Online 3D Printing Platforms", Journal of Engineering and Technology Management 37 (2015) 90-102.

(Continued)

*Primary Examiner* — Mila Airapetian
(74) *Attorney, Agent, or Firm* — Hamilton, Brook, Smith & Reynolds, P.C.

(57) ABSTRACT

In current systems, only one consumer can personalize a product using a single session or at a single device (e.g., a computer, mobile device). In an embodiment, a method includes providing, at a user device via a network, a user interface displaying a three-dimensional (3D) model of a consumer product selected by a user. The method further includes customizing the 3D model of the consumer product based on selections and manipulations of the consumer product received at the provided user interface from at least two users. The method further includes, responsive to finalization of the customized 3D model by one of the users, submitting the customized 3D model for 3D printing. In this manner, multiple people can collaborate to create a single 3D printed product.

20 Claims, 14 Drawing Sheets

(51) Int. Cl.
*B29L 31/00* (2006.01)
*G06F 111/02* (2020.01)

(56) References Cited

U.S. PATENT DOCUMENTS

| | | | | |
|---|---|---|---|---|
| 2009/0106669 A1* | 4/2009 | Winkler | ............... | G06Q 10/00 |
| | | | | 715/757 |
| 2009/0254832 A1* | 10/2009 | Li | ............... | G06Q 10/10 |
| | | | | 715/734 |
| 2011/0313878 A1* | 12/2011 | Norman | ............... | G06Q 30/06 |
| | | | | 705/26.5 |
| 2012/0281013 A1* | 11/2012 | Mahdavi | ............... | G06F 17/50 |
| | | | | 345/619 |
| 2013/0245801 A1* | 9/2013 | Schroeder | ............... | A61F 2/30 |
| | | | | 700/98 |

OTHER PUBLICATIONS

European Search Report for EP 16 20 7028 dated May 4, 2017 entitled "Personalizing Products With Social Collaboration".

Docs editors Help, "Share Google Drive files and folders"; https://support.google.com/docs/answer/2494822?hl=en&ref topic=4671185 retrieved from Internet Apr. 26, 2016.

Docs editors Help, "Add, edit, reply, or delete comments" https://support.google.com/docs/answer/65129?hl=en&ref topic=13680896 retrieved from Internet Apr. 26, 2016.

Docs editors Help, "Chat with others in a file" https://support.google.com/docs/answer/24984891?hl=en&reftopic=4671185 retrieved from Internet Apr. 26, 2016.

* cited by examiner

PERSONALIZING PRODUCTS WITH SOCIAL COLLABORATION

BACKGROUND

Retail products can be personalized for consumers using traditional and additive manufacturing (three-dimensional (3D) printing). For example, a consumer may desire a piece of jewelry with custom text, or with certain colors. The consumer may work with a retailer, for example via the retailer's website, to create the customized product and order it. The retailer can then 3D print the product and ship it to the consumer.

SUMMARY

In current systems, only one consumer can personalize a product using a single session or at a single device (e.g., a computer, mobile device). If a first person desires to share her personalized product with a second person, she has to show it to the second person on the same screen, by a screen shot that is shared via email or other messaging application. No current solution enables more than one person to personalize the same product at a same time while at multiple locations or on multiple devices.

Google™ Docs and similar tools allow collaboration on workplace documents from multiple people, such as text documents, spreadsheets, and slide presentations. However, such solutions do not offer the ability for consumers to collaborate to customize or edit a 3D-object. Google™ Docs, for example, further requires authentication using a single Google login, and does not allow for logins using alternative authentication.

In an embodiment of the present invention, multiple customers of an online retail store can connect to discuss and collaborate on a 3D-product by employing invitations from and authentication by social media. For example, an engaged couple can invite each other, via social media, to collaborate in a 3D environment to personalize wedding rings on a retail website together, or multiple family members can collaborate to create a customized product for another family member.

In an embodiment, a method includes, by a server with a processor, providing, at a user device via a network, a user interface displaying a three-dimensional (3D) model of a consumer product selected by a user. The method further includes customizing the 3D model of the consumer product based on selections and manipulations of the consumer product received at the provided user interface from at least two users. The method further includes, responsive to finalization of the customized 3D model by one of the users, submitting the customized 3D model for 3D printing.

In an embodiment, the method further includes enabling a first user to send an invite to a second user. The method further includes, responsive to the invitation, enabling customization of the consumer product by the first user and the second user through a first user device and a second user device, respectively.

In an embodiment, sending the invite to the second user is through an authentication service of a third-party.

In an embodiment, customizing the 3D model of the consumer product further includes enabling selection in the user interface by a first user of at least one aspect of the 3D model for customization, and, responsive to the selection, locking selection and customization from any user other than the first user.

In an embodiment, an aspect of the 3D model can include color, material, shape, or rotation of an element of the 3D model.

In an embodiment, the customizable elements are created by a separate system.

In an embodiment, providing the user interface includes displaying a unique avatar for each of the plurality of users customizing the 3D model. The unique avatar can correspond to a color or a pattern representing the user, such that the user interface displays the color or pattern corresponding to the user avatar of a particular user to indicate that an element of the 3D model is being customized by the particular user corresponding to the unique avatar.

In an embodiment, providing the user interface further includes enabling each of the plurality of users to view the 3D model from a different viewpoint in a 3D domain.

In an embodiment, a system includes a processor and a memory with computer code instructions stored therein. The memory can be operatively coupled to said processor such that the computer code instructions configure the processor to implement a user interface module configured to provide, at a user device via a network, a user interface displaying a 3D model of a consumer product selected by a user. The computer code instructions further configure the processor to implement a customization module configured to customize the 3D model of the consumer product based on selections and manipulations of the consumer product received at the provided user interface from at least two users. The computer code instructions further configure the processor to implement a printing module configured to, responsive to finalization of the customized 3D model by one of the users, submit the customized 3D model for 3D printing.

In an embodiment, a non-transitory computer-readable medium is configured to store instructions for customizing a 3D product. The instructions, when loaded and executed by a processor, cause the processor to provide, at a user device via a network, a user interface displaying a 3D model of a consumer product selected by a user. The instructions further cause the processor to customize the 3D model of the consumer product based on selections and manipulations of the consumer product received at the provided user interface from at least two users. The instructions further cause the processor to, responsive to finalization of the customized 3D model by one the users, submit the customized 3D model for 3D printing.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
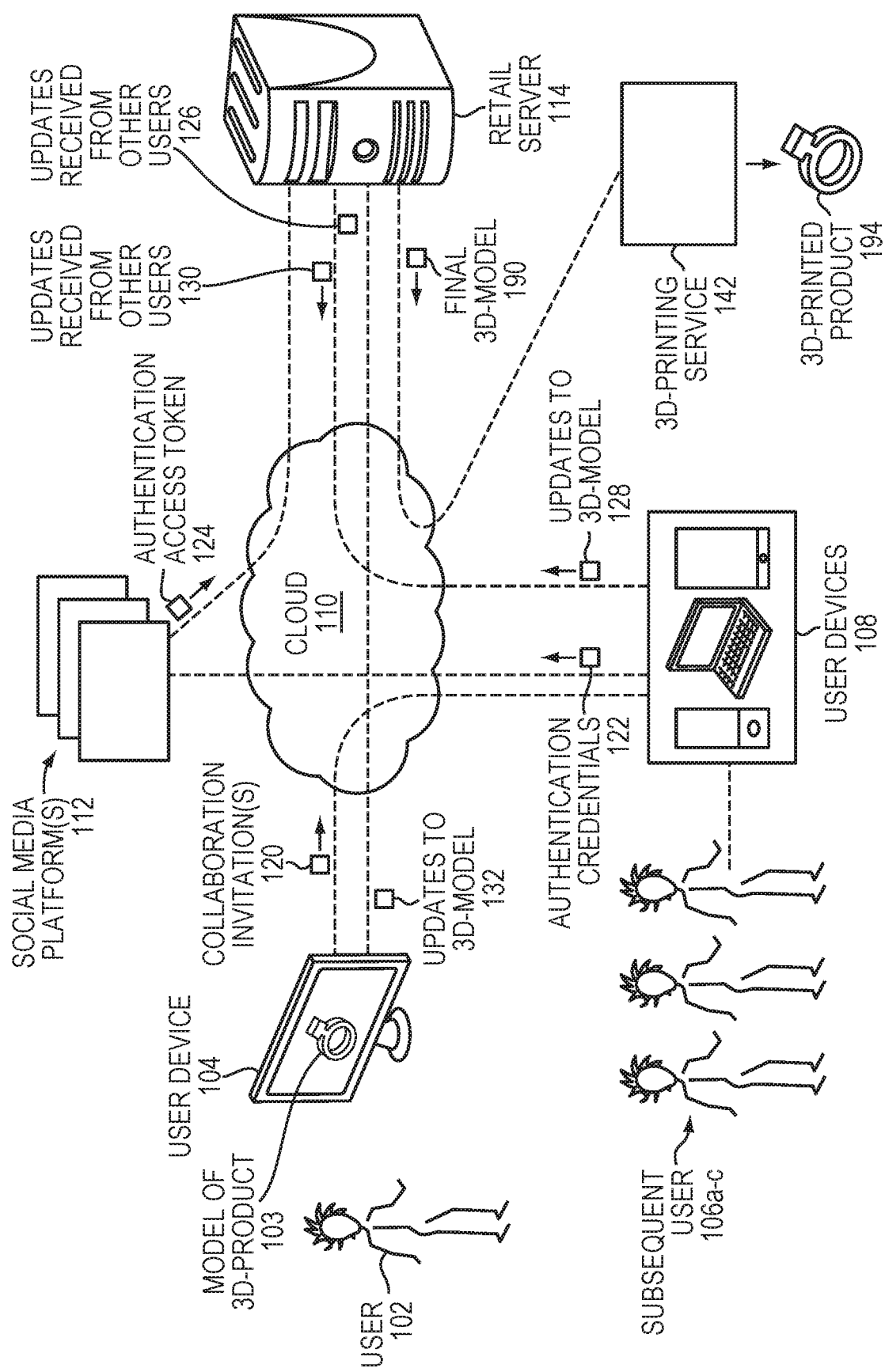
FIG. 1 is a diagram illustrating an example embodiment of the present invention.

FIG. 1 is a diagram 100 illustrating an example embodiment of the present invention. A user 102 can collaborate with subsequent users 106a-c on a model of a 3D product 103 displayed on a user device 104. The user device 104 is operatively connected to a retail server 114 and one or more social media platforms 112, and other user devices 108 via a cloud 110. The user 102 can select a 3D product offered by the retailer for customization. The user 102 can send updates to the 3D model 132 to the retail server 114 via the cloud 110. Examples of social media platforms 112 can include Facebook®, Twitter®, Instagram®, Pinterest™, Google+™. The user 102 can also invite subsequent users 106a-c by sending collaboration invitations 120 to the users' 106a-c corresponding user devices 108. The subsequent users 106a-c enter authentication credentials 122 on the user devices 108, which are forwarded through the cloud 110 to the social media platforms 112. The social media platforms can then grant access to the subsequent users 106a-c, if the authentication credentials 122 are correct, and send an authentication access token 124 to the retail server 114 for each authenticated user. A person of ordinary skill in the art can recognize that the collaboration invitations 120 can be sent to the user devices 108 via initiation from the social media platforms 112 in another embodiment as well.

Once the subsequent users 106a-c are authenticated, the retail server 114 allows the subsequent users 106a-c to enter updates to the 3D model 128 at the retail server 114. The user 102 can receive updates 130 from other users and the subsequent users 106a-c can receive updates 126 from other users. These updates 130 and 126, respectively, update the displays of the model of the 3D product 103 on the user devices 104 and 108.

In this manner, the initial user 102 and subsequent users 106a-c can all edit, customize, and collaborate on the model of the 3D product 103. Further, inviting subsequent users 106a-c is performed by employing already existing authentication from the subsequent users 106a-c social media accounts, simplifying the process of inviting the subsequent users 106a-c by:
  a) allowing the inviting user to take advantage of his or her already existing social network connections, and
  b) allowing the subsequent users 106-ac to customize the product without having to great an additional account.

Upon each user 102 and subsequent users 106a-c beginning customization of an element of the model of 3D product 103 by selecting the element for editing, the system locks all other users from customizing that element of the object. This prevents conflicts with multiple users editing the same element at the same time. Such simultaneous editing of the same element can cause problems, such as user's attempting to change the same element to different shapes, colors, or materials. A person of ordinary skill in the art can recognize, however, that each user can modify separate/different elements of the model of the 3D product 103 simultaneously.

When the users 102 and 106a-c finalize the 3D product 103, they can signal to the retail server 114 that the product is finalized and further to issue an order of the product. In various embodiments, the initial user 102 may be the only user who can finalize the product, any user 102 or 106a-c can finalize the product, or the group of users as a whole 102 or 106a-c can vote or unanimously decide to finalize the product. The retail server 114 can then issue a final 3D model 140 to a 3D printing service 142 via the cloud 110. The 3D printing service 142 then creates a 3D printed product 144, which can be shipped to one of the users 102 and 106a-c or to a third party, for example, as a gift. In this manner, multiple users can electronically collaborate on a customized 3D product that is printed as a tangible object and shipped to the customer.

Figure 2A:
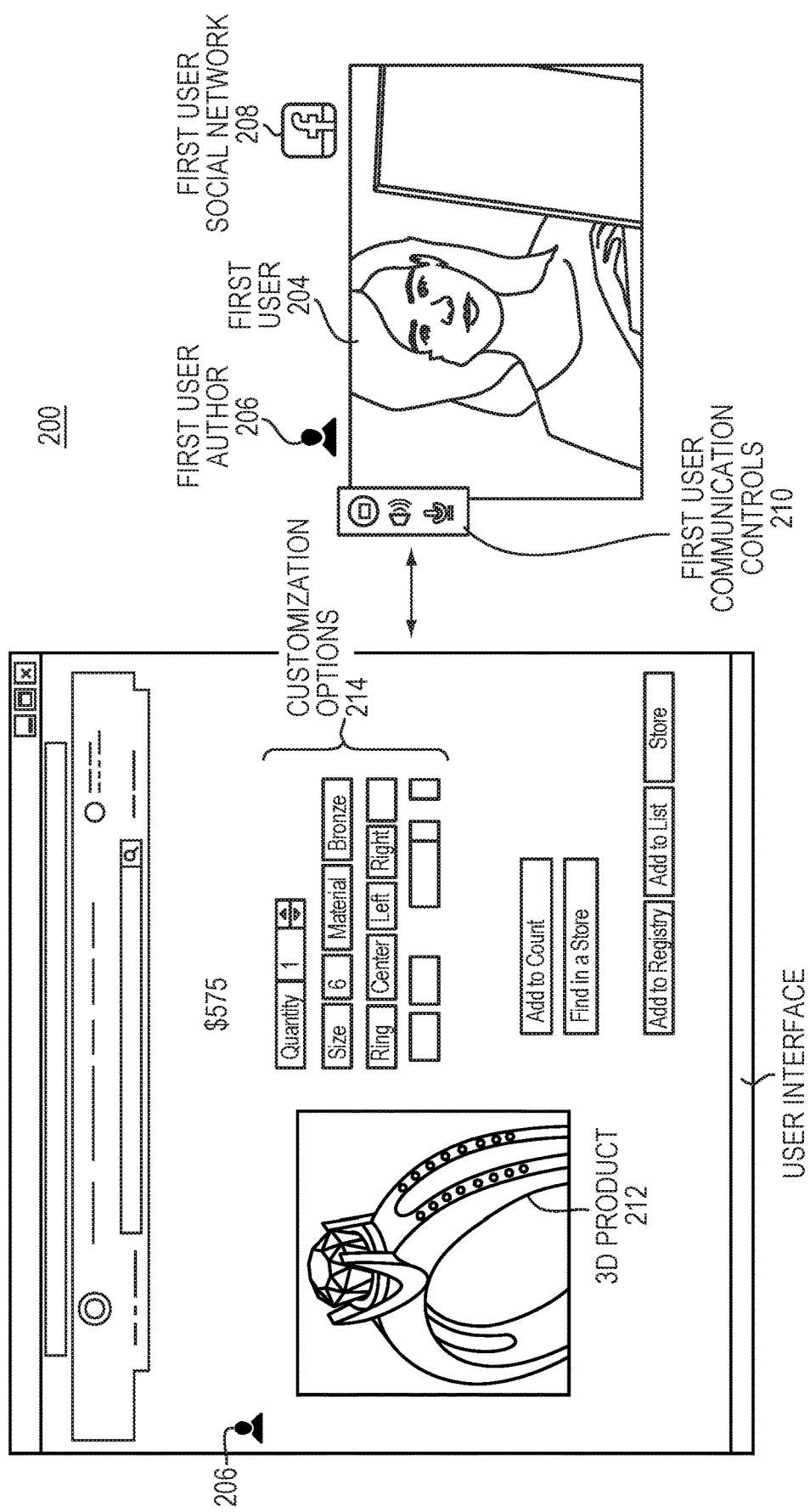
FIG. 2A is a diagram illustrating an example embodiment of the present invention.

FIG. 2A is a diagram 200 illustrating an example embodiment of the present invention. A first user 204 visits a retail web site, which presents user interface 202 to the first user 204. The user interface 202 displays a 3D product 212, in this instance, a ring with a gemstone. The user interface further presents customization options 214, allowing the user to change different aspects of the ring, such as the material of the ring, the type of gemstone(s), or color(s), shapes, or patterns on various parts of the rings. The user can further also customize an engraving on the ring. The user interface also shows a first user avatar 206 of the user to show that the first user 204 is editing the 3D product 212. A first user communication controls panel 210 can be presented on the user interface 202 and allow the first user to start a webcam communication session, microphone communication session, or adjust speaker or microphone volume. The first user 204 can also be associated with a first user social network 208. In this instance, the first user social network 208 is Facebook®, but a person of ordinary skill in the art can recognize the social network can be any other social network such as Twitter®, Blogger®, LinkedIn®, YouTube®, Instagram® and Snapchat®.

Figure 2B:
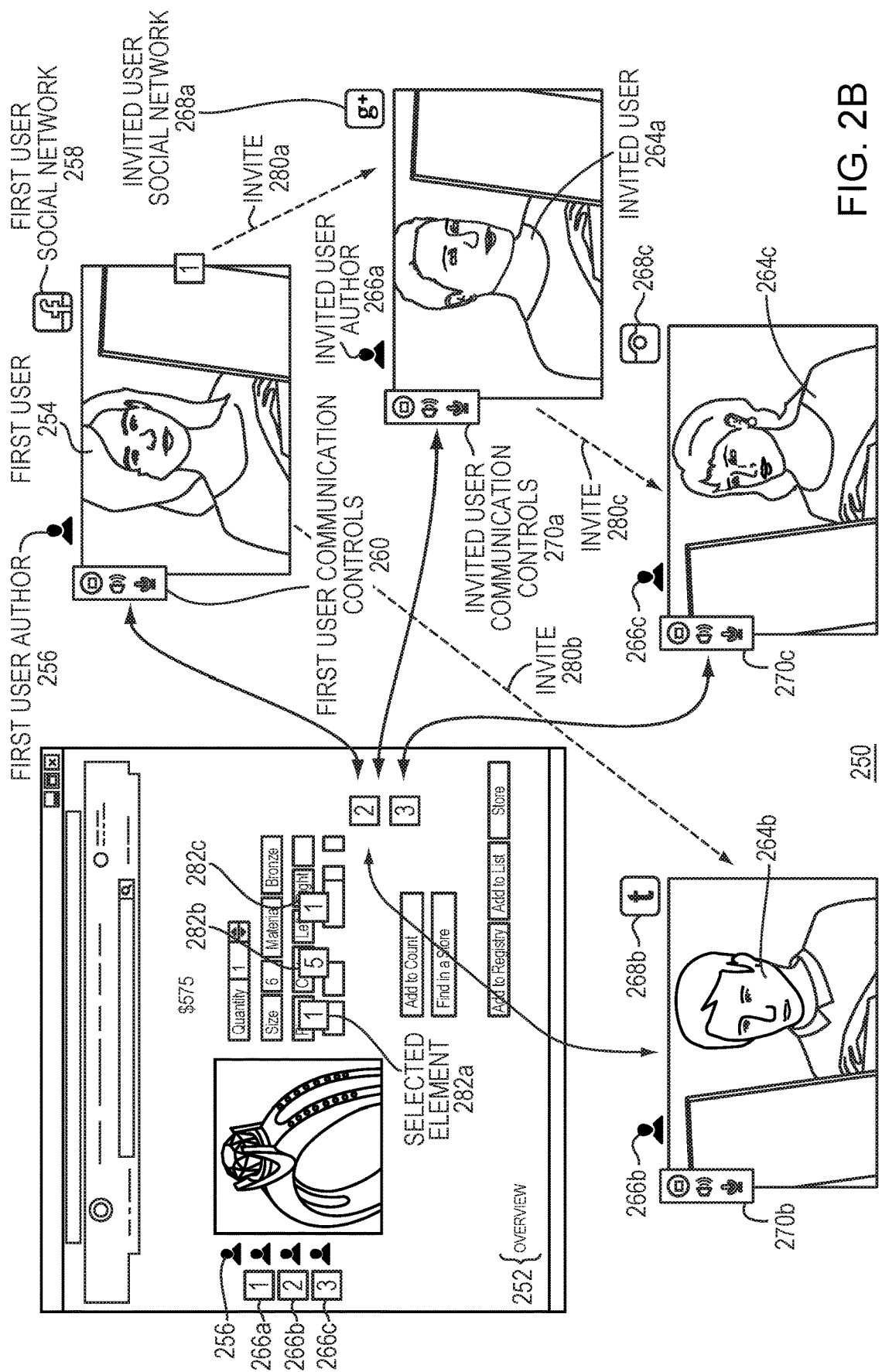
FIG. 2B is a diagram illustrating an example embodiment of the present invention.

FIG. 2B is a diagram 250 illustrating an example embodiment of the present invention. The retailer's website presents user interface 252 having multiple users logged in, but otherwise similar to the user interface 202 of FIG. 2A. The multiple users include first user 254 associated with a first user social network 258 and invited users 264a-c. Each invited user 264a-c can belong to a respective invited social network 268a-c, and is associated with an invited user avatar 266a, which is shown on the user interface 252 indicating that its respective user is editing the 3D product. Further, each invited user has an invited user communication control 270a-c allowing the invited user to initiate webcam or audio communications, or control volume of their speaker or microphone.

The first user 254 can issue invitations 280a-b to invited users 266a-c. Then, each invited user has the power to invite other users. For example, invited user 264a can send invite 280c to invited user 264c. Once accepted, all users 254 and 264a-c can customize various aspects of the 3D product. In addition, all users 254 and 264a-c are enabled to see the product from a customized viewpoint, which includes a customized rotation viewpoint and a customized zoom level. Each user, therefore, may see the 3D product from a different viewpoint in the 3D domain.

Figure 3A:
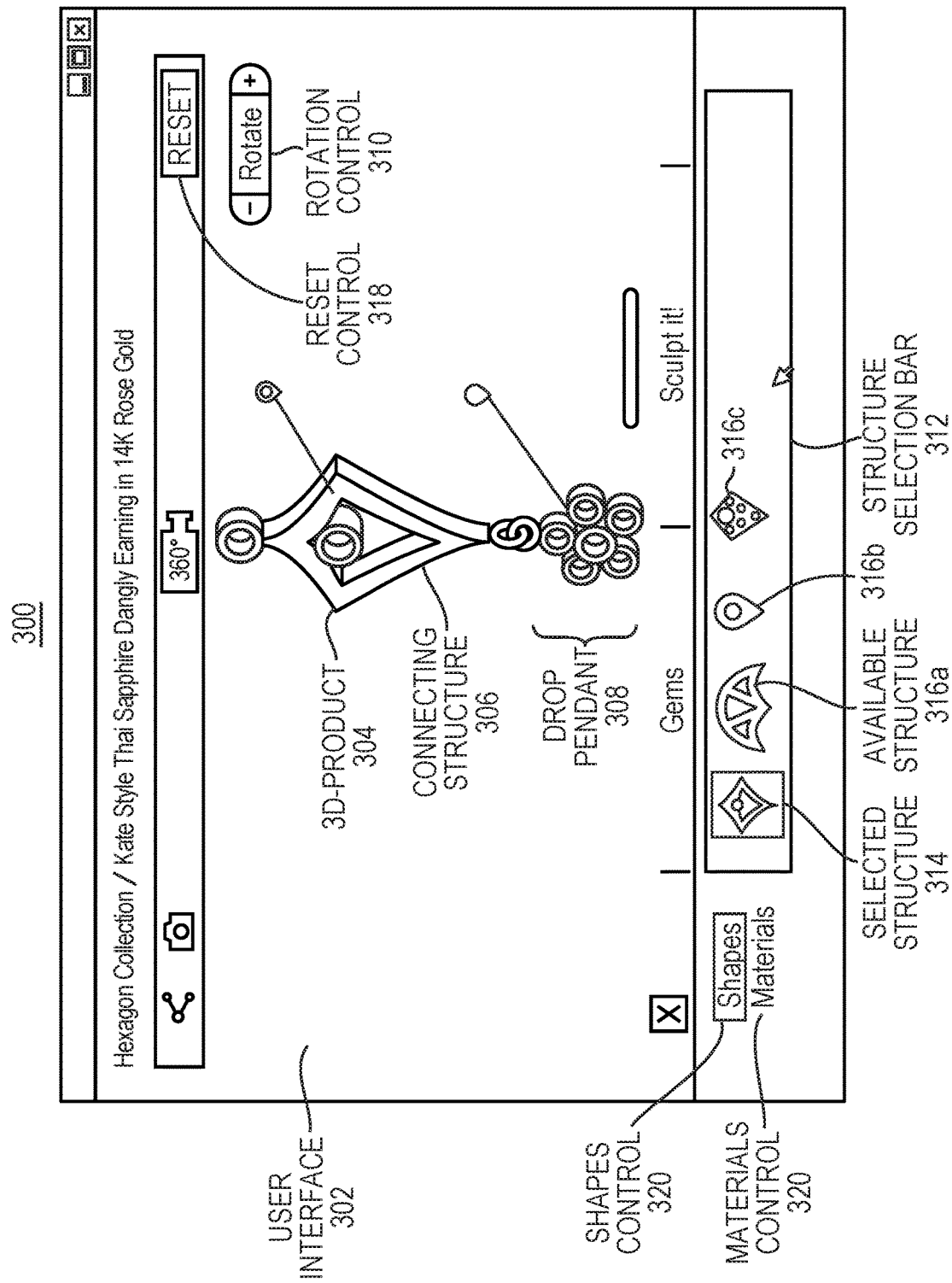
FIG. 3A is a diagram illustrating an example embodiment of a user interface.

FIG. 3A is a diagram 300 illustrating an example embodiment of a user interface 302. The user interface 302 presents a 3D product 304 having a connecting structure 306 and drop pendant 308 to the user. The user interface further presents multiple controls to the user:

a) a rotation control 310 for rotating elements of the 3D product 304;
b) a reset control 318 for resetting the 3D product 304 to its original state;
c) a structure selection bar 312 for selecting different structures (e.g., available structures 316a-c and selected structure 314) for the selected element;
d) a shapes control 320 for activating the structure selection bar 312;
e) a materials control 322 for activating a materials selection bar (not shown in FIG. 3A).

Multiple users may collaborate to customize the 3D product 304, as shown in FIGS. 1 and 2A-B. Each element of the 3D product 304 may have a particular border indicating a color or pattern showing which user is customizing that element. For example, the connecting structure 306 has a border showing that particular element of the 3D product is being edited by a user having an avatar associated with the color or pattern of the border. Alternatively, the entire element could be shaded by a certain color, pattern, or brightness to indicate which user is editing it as well.

Figure 3B:
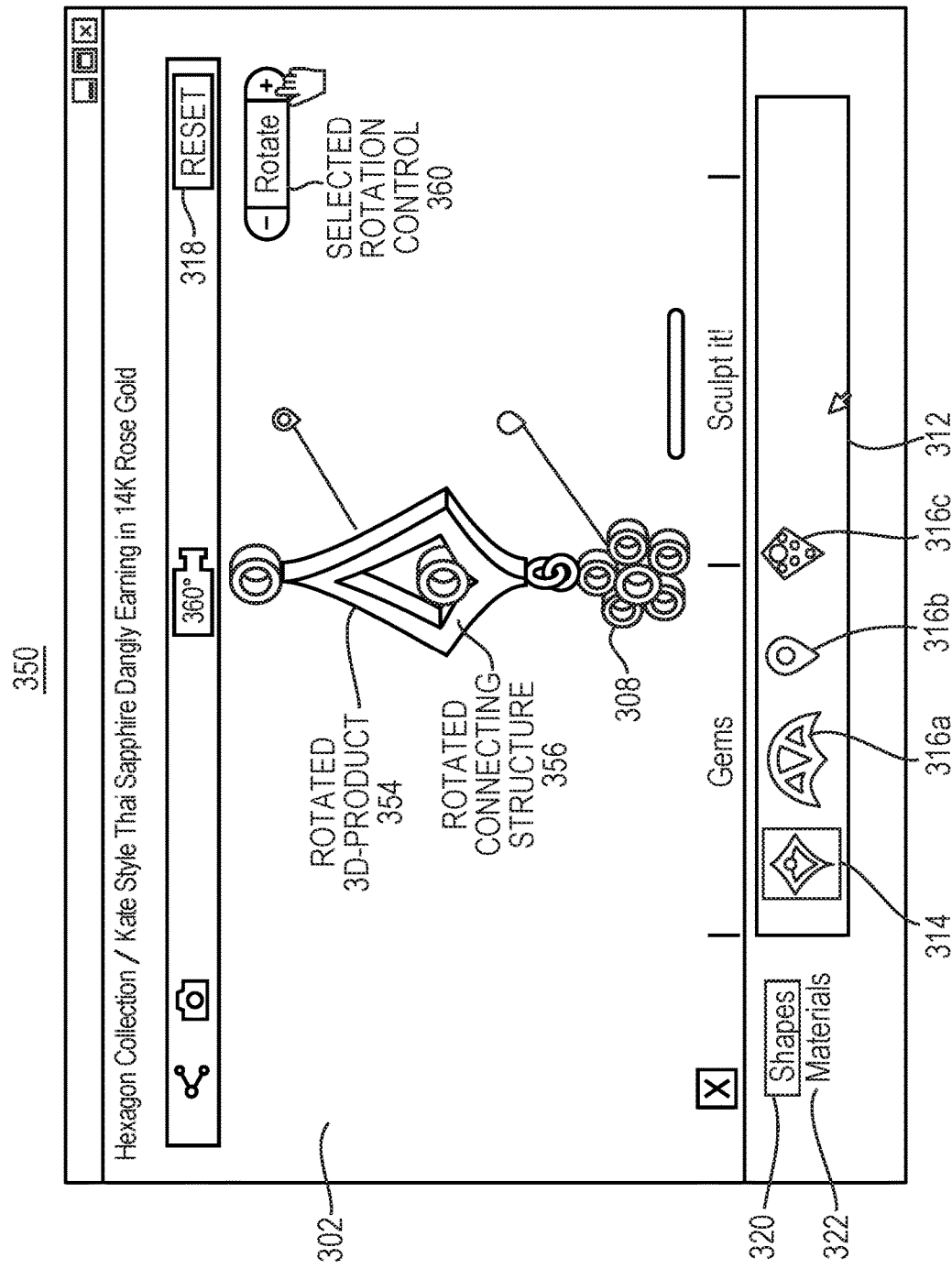
FIG. 3B is a diagram illustrating an example embodiment of the present invention.

FIG. 3B is a diagram 350 illustrating an example embodiment of the present invention. The user has selected the rotation control 360 of the user interface 302, similar to the user interface 302 of FIG. 3A. The user interface 302 in turn presents a rotated 3D product 354 and a rotated connecting structure 356.

Figure 4A:
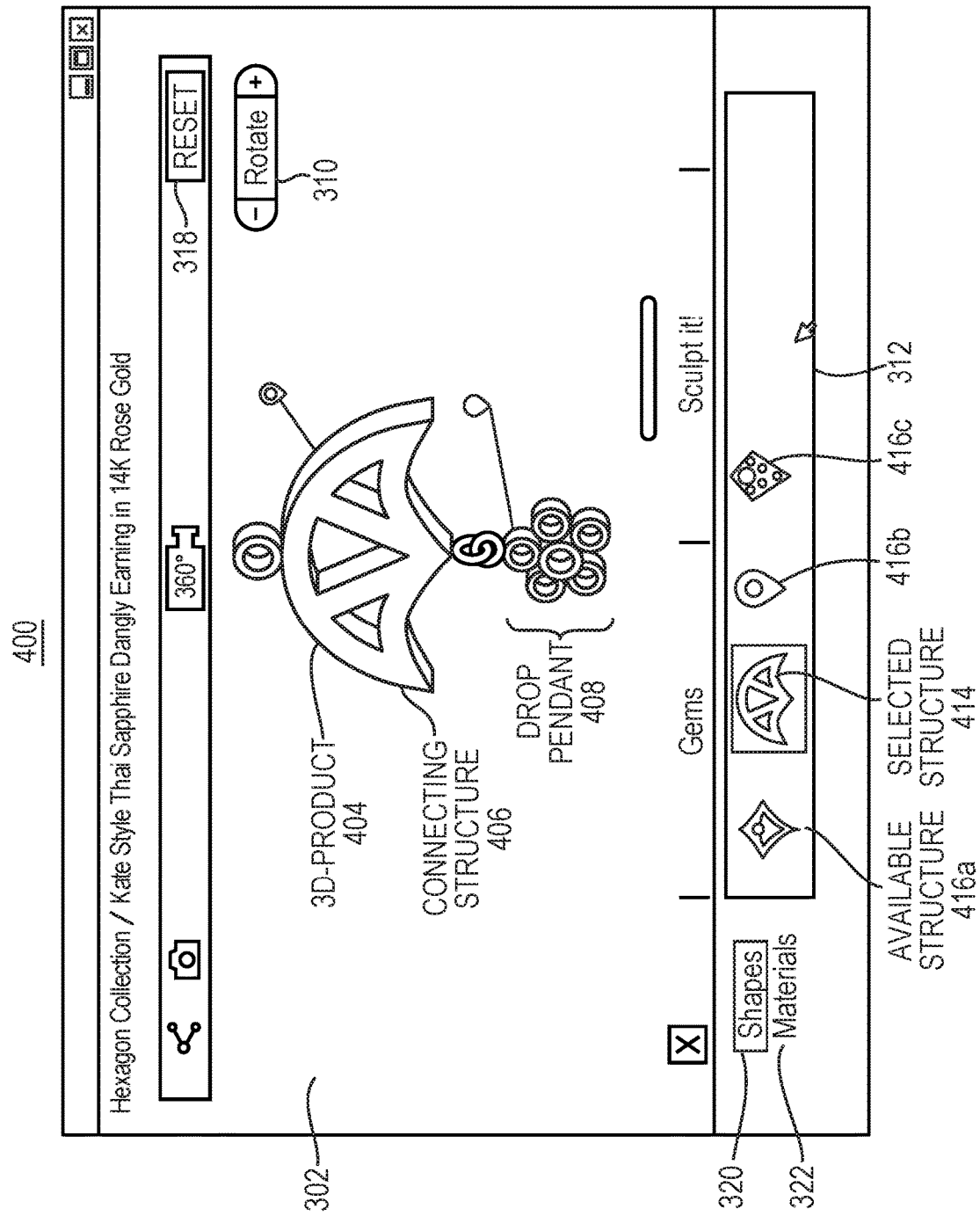
FIG. 4A is a diagram illustrating an example embodiment of the present invention.

FIG. 4A is a diagram 400 illustrating an example embodiment of the present invention. FIG. 4A presents a user interface 302 similar to the user interface 302 of FIGS. 3A-B. In this example, the user interface 302 presents a 3D product 404 having a connecting structure 406 corresponding to the user selection of the selected structure 414 of the available structures 416a-c from the structure selection bar 312. The user can select different available structures and materials for each element, customizing the 3D product 404.

Figure 4B:
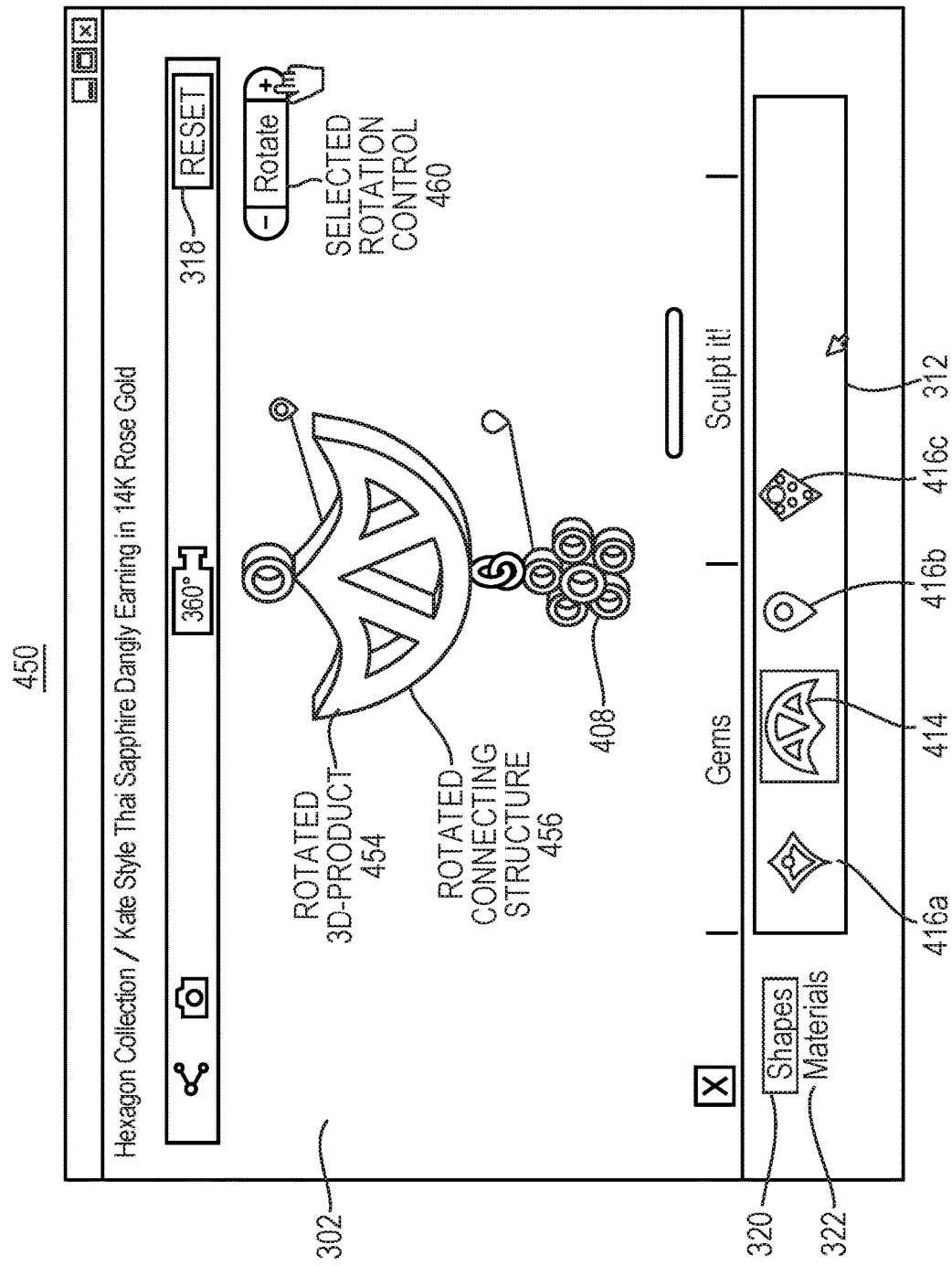
FIG. 4B is a diagram illustrating an example embodiment of the present invention.

FIG. 4B is a diagram 450 illustrating an example embodiment of the present invention. FIG. 4B presents a user interface 302 similar to the user interface 302 of FIGS. 3A-B and FIG. 4A. The user interface 302 presents a rotated 3D product 454 responsive to the user selecting the selected rotation control 460, such that the connecting structure 456 has been rotated 180 degrees.

Figure 5:
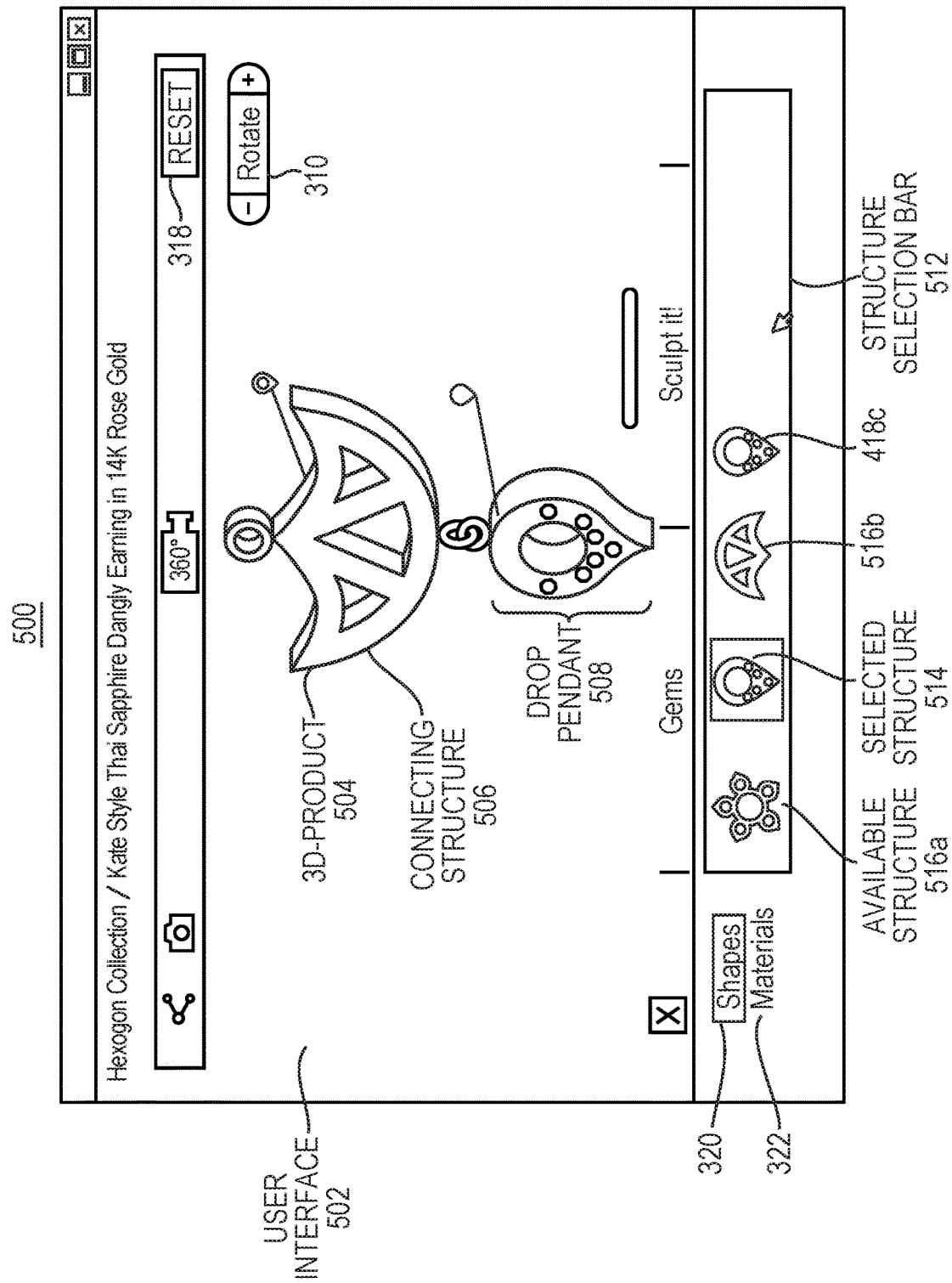
FIG. 5 is a diagram illustrating an example embodiment of the present invention.

FIG. 5 is a diagram 500 illustrating an example embodiment of the present invention. User interface 502 is similar to the user interface 302 of FIGS. 3A-B and FIGS. 4A-B; however, user interface 502 shows the drop-pendant 508 being edited via the highlighting specific to a given user. Specifically, after the user selected the drop pendant 508, the user chose selected structure 514 of the available structures 516a-c from the structure selection bar. The user interface 502 responsively presents drop pendant 508 having the selected structure 514.

Figure 6A:
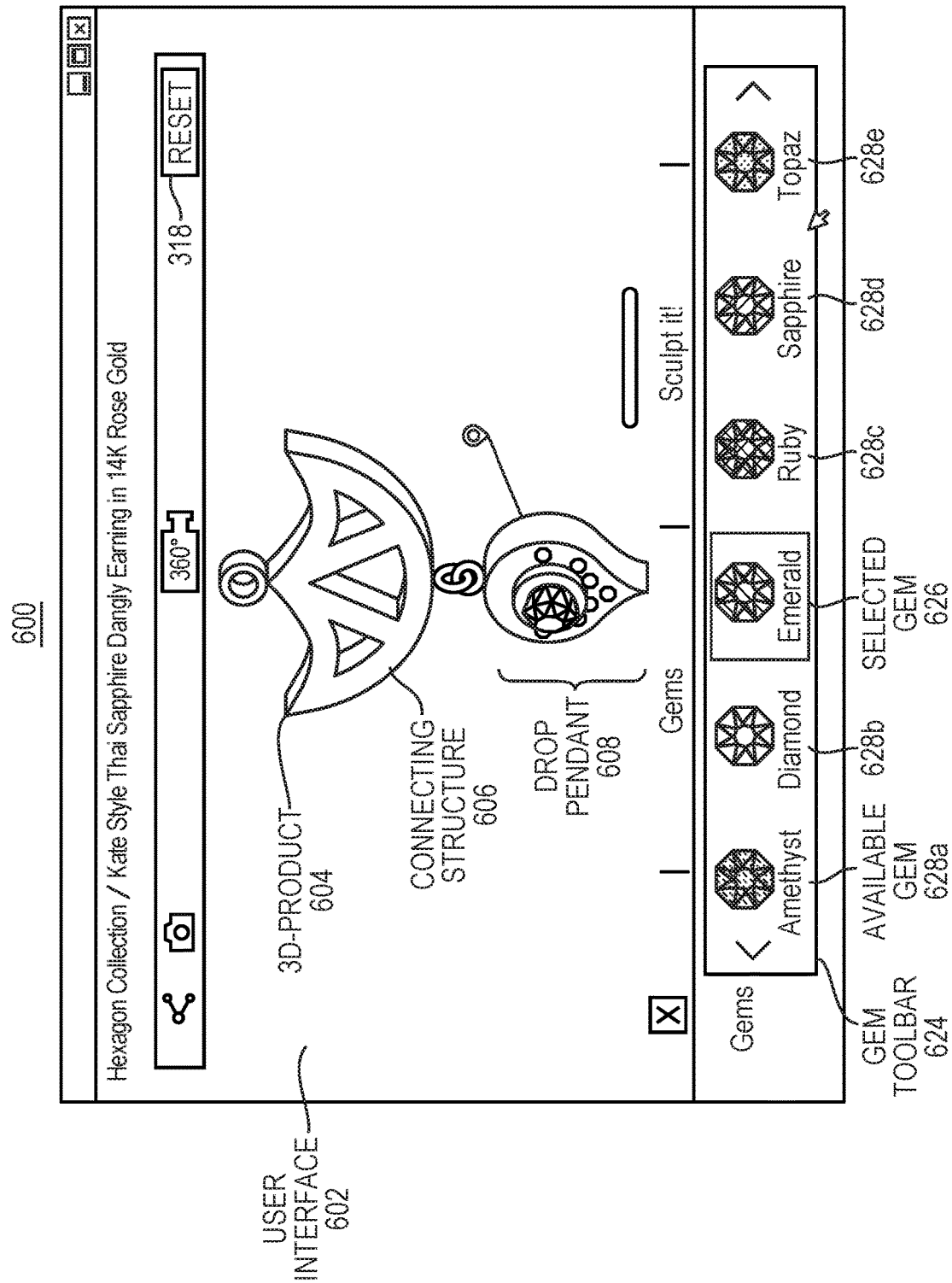
FIG. 6A is a diagram illustrating an example embodiment of the present invention.

FIG. 6A is a diagram 600 illustrating an example embodiment of the present invention. User interface 602 is similar to the user interface 302 of FIGS. 3A-B, 4A-B, and user interface 502 of FIG. 5; however, user interface 602 shows the gemstone of the drop pendant 608 being edited. In response to the user selecting the gem of the drop pendant 608, the user interface 602 displays gem toolbar 624. The user then chooses selected gem 626 (e.g., emerald) of the available gems 628a-e in the gem toolbar 624. The user interface 602 responsively presents the drop pendant 608 having the selected gem 626 (e.g., emerald).

Figure 6B:
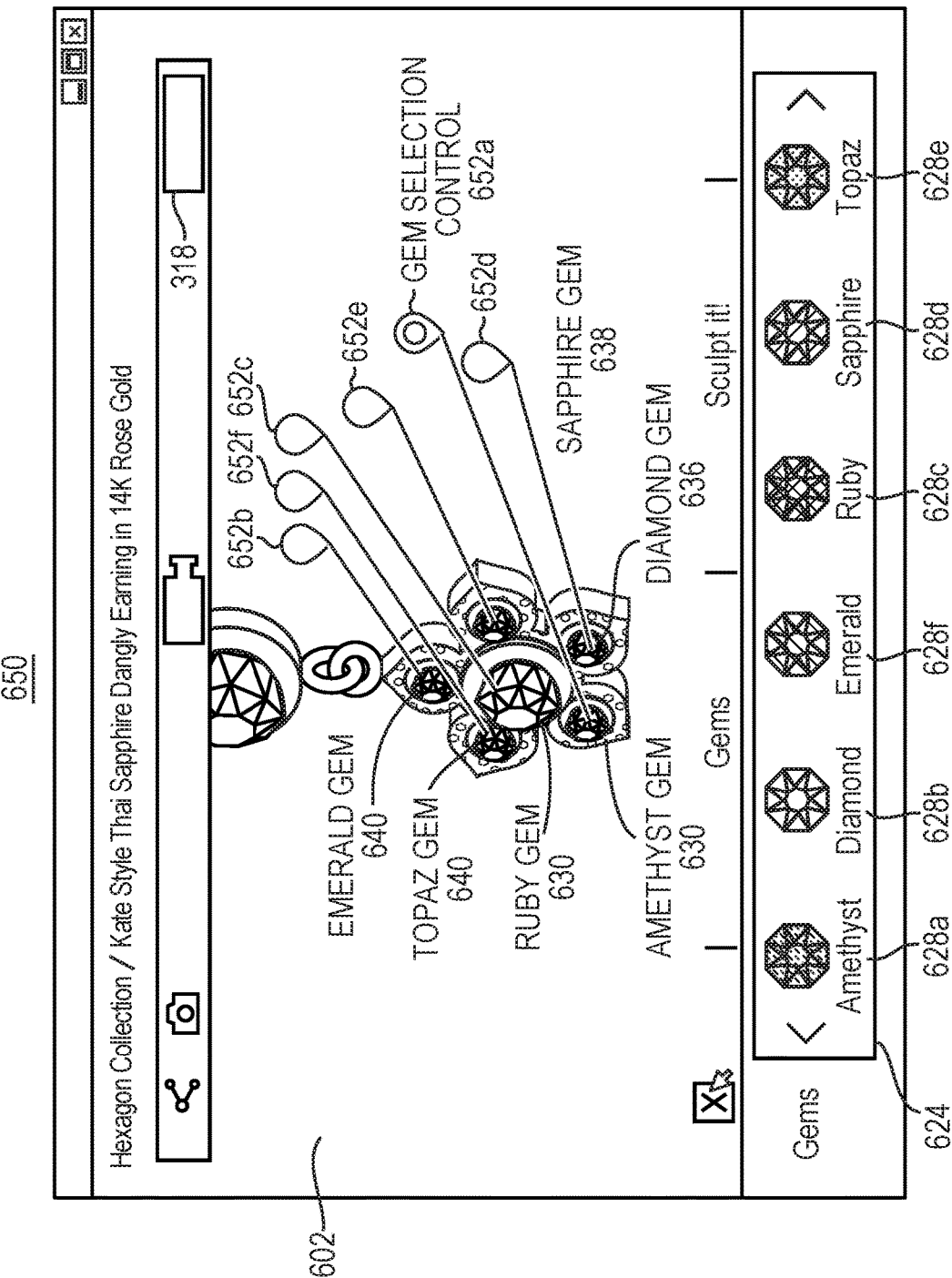
FIG. 6B is a diagram illustrating an example embodiment of the present invention.

FIG. 6B is a diagram 650 illustrating an example embodiment of the present invention. User interface 602 is similar to the user interface 302 of FIGS. 3A-B, 4A-B, user interface 502 of FIG. 5, and user interface 602 of FIG. 6A; however, user interface of FIG. 6B shows multiple gemstones of the drop pendant 608 being edited. As the drop pendant 608 in FIG. 6A has multiple gems, the user interface presents multiple gem selection controls 652a-f. The user can select each gem separately and then choose an available gemstone 628a-f from the gem selection toolbar 624. The user interface 602 then presents, responsively, ruby gem 630, topaz gem 632, amethyst gem 634, diamond gem 636, sapphire gem 638, and emerald gem 640.

Figure 7:
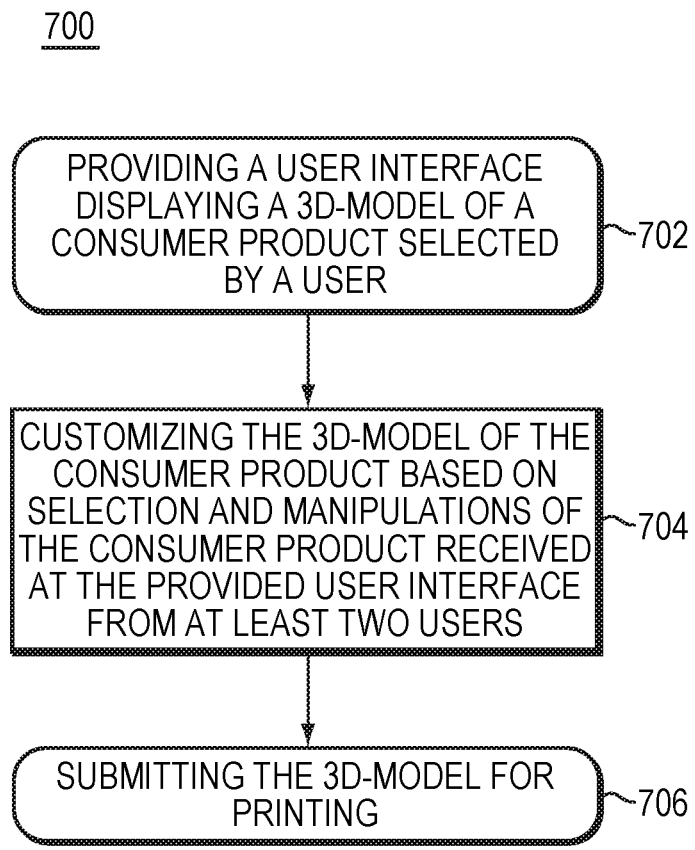
FIG. 7 is a flow diagram illustrating an example embodiment of a process employed by the present invention.

FIG. 7 is a flow diagram 700 illustrating an example embodiment of a process employed by the present invention. The process includes providing a user interface displaying a 3D model of a consumer product selected by a user (702). A server can provide the user interface at a user device of a user or multiple user devices of multiple users. Then, the process allows customization of the 3D model of the consumer product based on selections and manipulations of the consumer product received at the provided user interface from at least two users of the plurality of users (704). This customization can occur after an initial user has sent invitations to other users to also customize the product. The method further includes, responsive to finalization of the customized 3D model by at least one of the plurality of users, submitting the customized 3D model for 3D printing (706).

Figure 8:
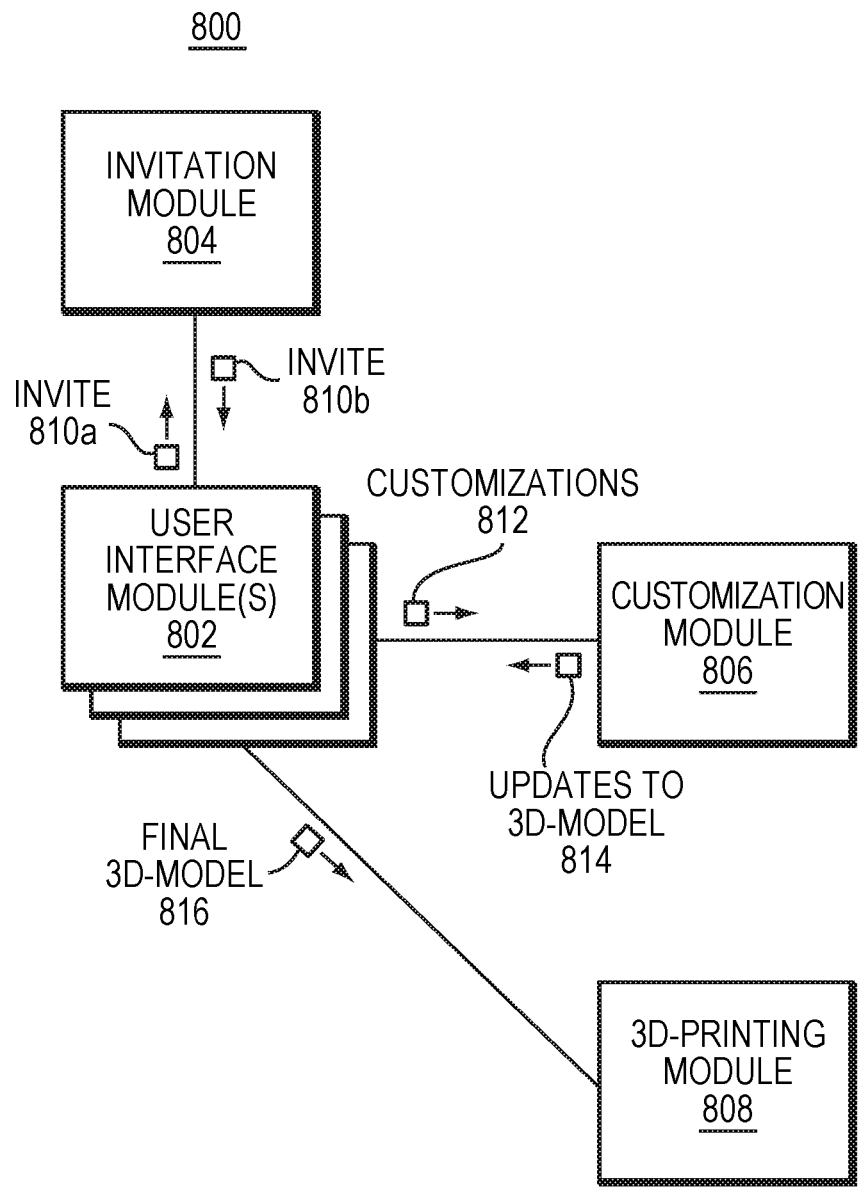
FIG. 8 is a block diagram illustrating an example embodiment of the present invention.

FIG. 8 is a block diagram 800 illustrating an example embodiment of the present invention. One or more user interface modules 802 enable a user to send one or more invitations 810a to an invitation module 804. In response, the invitation module 804 sends an invitation 810b to an appropriate different user and user interface module 802. Then, all invited users, via their corresponding user interface module 802, can send customizations 812 to a customization module 806. The customizations 812 are to different elements of the 3D model, but each separate element can be customized simultaneously. However, as described above, two users cannot customize the same element at the same time. In response to receiving the customizations 812, the customization module 806 provides updates 814 to 3D model to each of the user interface modules 802. Then, when the users finalize the 3D model, one or more of the user interface modules 802 send the final 3D model 816 to a 3D printing module 808 for printing. Then, the customized 3D printed product can be shipped to the customer.

Figure 9:
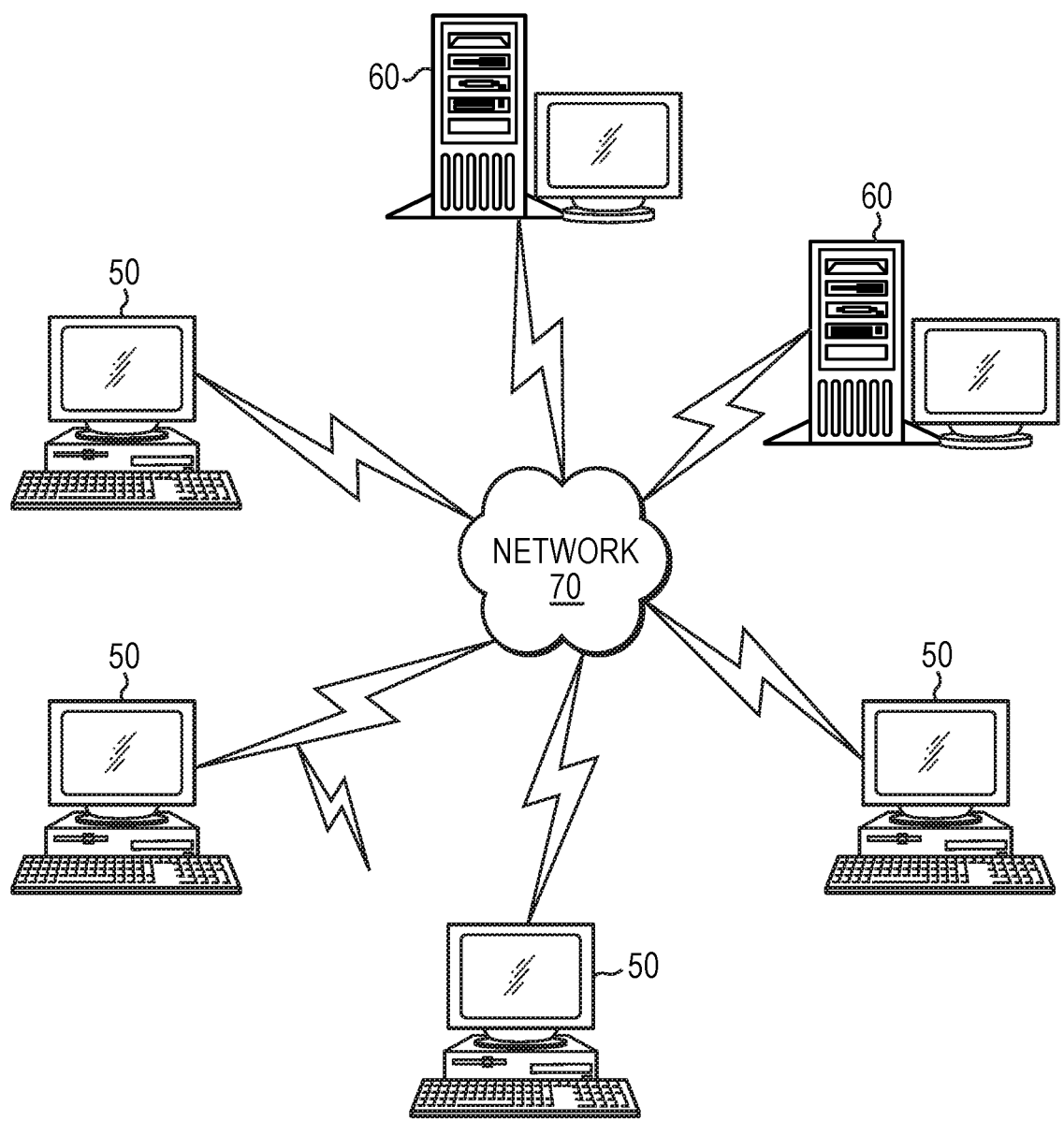
FIG. 9 illustrates a computer network or similar digital processing environment in which embodiments of the present invention may be implemented.

FIG. 9 illustrates a computer network or similar digital processing environment in which embodiments of the present invention may be implemented.

Client computers and/or devices 50 and one or more server computers 60 provide processing, storage, and input/output devices executing application programs and the like. The client computers/devices 50 can also be linked through a communications network 70 to other computing devices, including other client computers/devices 50 and server computers 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 10:
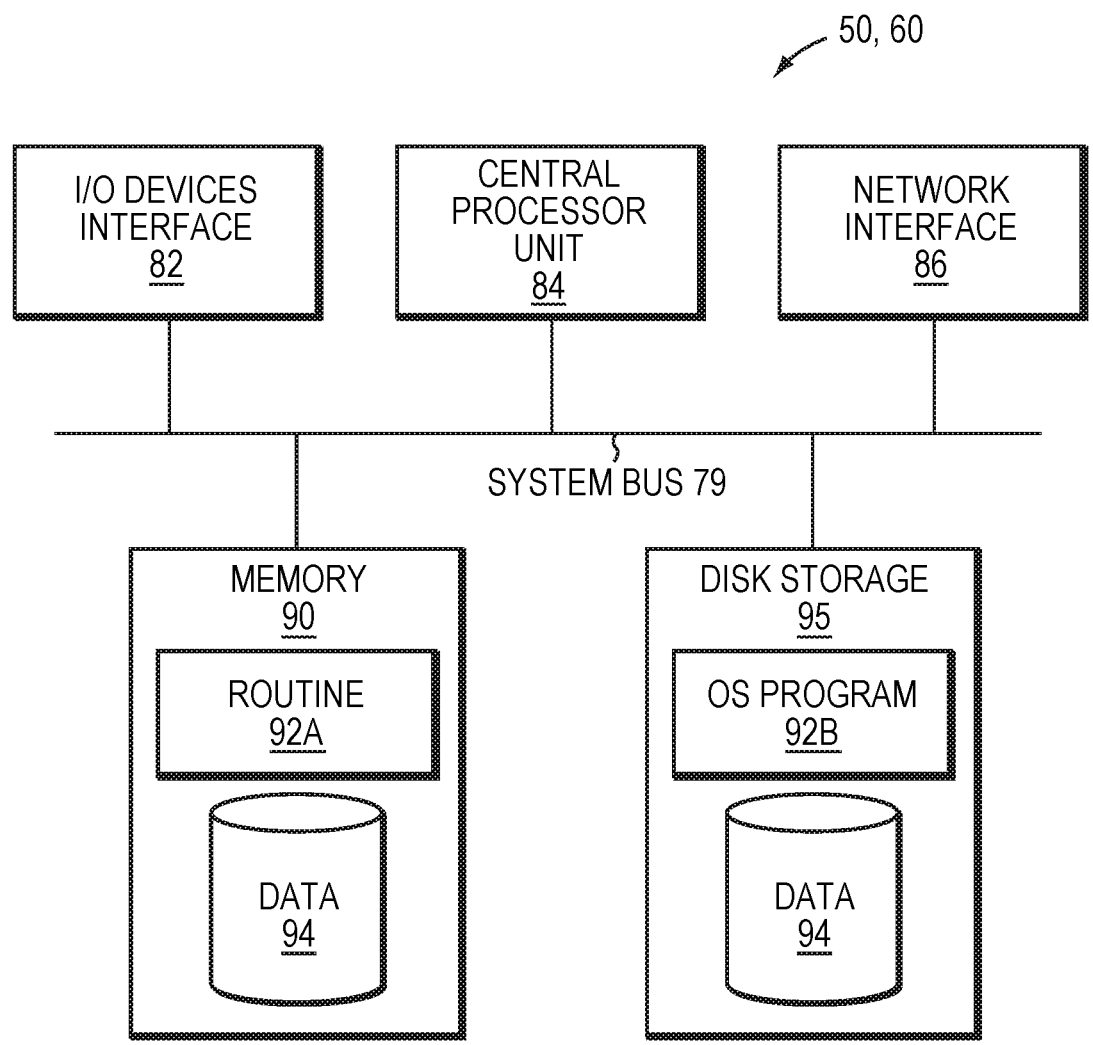
FIG. 10 is a diagram of an example internal structure of a computer (e.g., client processor/device or server computers) in the computer system of FIG. 9.

FIG. 10 is a diagram of an example internal structure of a computer (e.g., client computer/device 50 or server computers 60) in the computer system of FIG. 9. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 9). Memory 90 provides volatile storage for computer software instructions or routines 92A and data 94 used to implement an embodiment of the present invention (e.g., user interface module, invitation module, customization module code detailed above). Disk storage 95 provides non-volatile storage for computer software instructions or operating system (OS) programs 92B and data 94 used to implement an embodiment of the present invention. A central processor unit 84 is also attached to the system bus 79 and provides for the execution of computer instructions.

In one embodiment, the processor routines 92A, programs 92B, and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/programs 92.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
by a server with a processor:
generating, at a server with a processor, a user interface displaying, on a plurality of user devices via a network, a three-dimensional (3D) model of a consumer product selected by a respective user of a plurality of users and a two-dimensional (2D) control panel;
customizing the 3D model of the consumer product stored at the server based on selections and manipulations of the consumer product received at the 2D control panel of the user interface displayed at respective user devices from at least two users of the plurality of user devices; and
responsive to receiving, at the server, a finalization of the customized 3D model from at least one of the plurality of user devices, submitting the customized 3D model for 3D printing.

2. The method of claim 1, further comprising:
enabling a first user of the plurality of users to send an invitation to a second user of the plurality of users;
responsive to the invitation, enabling customization of the consumer product by the first user and the second user through a first user device and a second user device, respectively.

3. The method of claim 2, wherein sending the invitation to the second user is through an authentication service of a third party.

4. The method of claim 1, wherein customizing the 3D model of the consumer product further includes:
enabling selection, in the user interface by a first user of the plurality of users, of at least one aspect of the 3D model for customization;
responsive to the selection, locking selection and customization from any user other than the first user of the plurality of users.

5. The method of claim 1, wherein the at least one aspect of the 3D model can include at least one of color, material, shape, and rotation of an element of the 3D model.

6. The method of claim 1, wherein the customizable elements are created by a separate system.

7. The method of claim 1, where providing the user interface includes displaying a unique avatar for each of the plurality of users customizing the 3D model, the unique avatar corresponding to at least one of a color and a pattern representing the user, such that the user interface can display the color or pattern corresponding to the user avatar of a particular user to indicate that an element of the 3D model is being customized by the particular user corresponding to the unique avatar.

8. A system comprising:
a processor; and
a memory with computer code instructions stored therein, the memory operatively coupled to the processor such that the computer code instructions configure the processor to implement:
a user interface module configured to generate, at a server with a processor, a user interface displaying, on a plurality of user devices via a network, a three-dimensional (3D) model of a consumer product selected by a respective user of a plurality of users and a two-dimensional (2D) control panel;
a customization module configured to customize the 3D model of the consumer product stored at the server based on selections and manipulations of the consumer product received at the 2D control panel of respective the user interface displayed at respective user devices from at least two users of the plurality of user devices; and
a printing module configured to, responsive to receiving, at the server, a finalization of the customized 3D model from at least one of the plurality of user devices, submit the customized 3D model for 3D printing.

9. The system of claim 8, wherein the instructions configure the processor to implement:

an invitation module configured to enable a first user of the plurality of users to send an invitation to a second user of the plurality of users;

wherein the customization module is further configured to, responsive to the invitation, enable customization of the consumer product by the first user and the second user through a first user device and a second user device, respectively.

10. The system of claim 9, wherein the invitation module is further configured to send the invitation to the second user through an authentication service of a third party.

11. The system of claim 8, wherein the customization module is further configured to:

enable selection in the user interface by a first user of at least one aspect of the 3D model for customization; and responsive to the selection, lock selection and customization from any user other than the first user of the plurality of users.

12. The system of claim 8, wherein the at least one aspect of the 3D model can include at least one of color, material, shape, and rotation of an element of the 3D model.

13. The system of claim 8, wherein the customizable elements are created by a separate system.

14. The system of claim 8, where the user interface module is further configured to display a unique avatar for each of the plurality of users customizing the 3D model, the unique avatar corresponding to at least one of a color and a pattern representing the user, such that the user interface can display the color or pattern corresponding to the user avatar of a particular user to' indicate that an element of the 3D model is being customized by the particular user corresponding to the unique avatar.

15. A non-transitory computer-readable medium configured to store instructions for customizing a three-dimensional (3D) product, the instructions, when loaded and executed by a processor, cause the processor to:

generating, at a server with a processor, a user interface displaying, on a plurality of user devices via a network, a three-dimensional (3D) model of a consumer product selected by a respective user of a plurality of users and a two-dimensional (2D) control panel;

customize the 3D model of the consumer product stored at the server based on selections and manipulations of the consumer product received at the 2D control panel of the user interface displayed at respective user devices from at least two users of the plurality of user devices; and responsive to receiving, at the server, a finalization of the customized 3D model from at least one of the plurality of user devices, submit the customized 3D model for 3D printing.

16. The non-transitory computer-readable medium of claim 15, wherein the instructions further cause the processor to:

enable a first user of the plurality of users to send an invitation to a second user of the plurality of users;

responsive to the invitation, enable customization of the consumer product by the first user and the second user through a first user device and a second user device, respectively.

17. The non-transitory computer-readable medium of claim 16, wherein the invitation is sent to the second user through an authentication service of a third party.

18. The non-transitory computer-readable medium of claim 15, wherein the instructions cause the processor to customize the 3D model of the consumer product by:

enabling selection in the user interface by a first user of at least one aspect of the 3D model for customization;

responsive to the selection, locking selection and customization from any user other than the first user of the plurality of users.

19. The non-transitory computer-readable medium of claim 15, wherein the at least one aspect of the 3D model can include at least one of color, material, shape, and rotation of an element of the 3D model.

20. The non-transitory computer-readable medium of claim 15, wherein the customizable elements are created by a separate system.

* * * * *